US008412886B2

United States Patent
Kiyota

(10) Patent No.: US 8,412,886 B2
(45) Date of Patent: Apr. 2, 2013

(54) CACHE CONTROLLER AND CONTROL METHOD FOR CONTROLLING ACCESS REQUESTS TO A CACHE SHARED BY PLURAL THREADS THAT ARE SIMULTANEOUSLY EXECUTED

(75) Inventor: Naohiro Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 12/654,310

(22) Filed: Dec. 16, 2009

(65) Prior Publication Data
US 2010/0100686 A1    Apr. 22, 2010

Related U.S. Application Data

(63) Continuation of application No. PCT/JP2007/062325, filed on Jun. 19, 2007.

(51) Int. Cl.
G06F 13/18    (2006.01)
G06F 12/00    (2006.01)

(52) U.S. Cl. ........ 711/131; 711/118; 711/130; 711/147; 711/148; 711/149; 711/150; 711/151; 711/154; 711/158; 709/226; 718/104

(58) Field of Classification Search .................. 711/118, 711/130, 131, 147–151, 154, 158; 709/226; 718/104
See application file for complete search history.

(56) References Cited

U.S. PATENT DOCUMENTS

| | | | |
|---|---|---|---|
| 6,430,654 B1 | 8/2002 | Mehrotra et al. | |
| 7,073,033 B2 * | 7/2006 | Sexton et al. | 711/153 |
| 7,337,303 B2 * | 2/2008 | Anderson et al. | 712/214 |
| 7,751,402 B2 * | 7/2010 | Wolrich et al. | 370/394 |
| 2003/0219027 A1 * | 11/2003 | Kim et al. | 370/419 |
| 2003/0233394 A1 | 12/2003 | Rudd et al. | |

(Continued)

FOREIGN PATENT DOCUMENTS

| | | |
|---|---|---|
| EP | 1 622 003 A1 | 2/2006 |
| JP | 2006-40141 | 2/2006 |

(Continued)

OTHER PUBLICATIONS

International Search Report for PCT/JP2007/062325, mailed Dec. 11, 2007.

(Continued)

Primary Examiner — Arpan P. Savla
(74) Attorney, Agent, or Firm — Staas & Halsey LLP

(57) ABSTRACT

In such a configuration that a port unit is provided which takes a form being shared among threads and has a plurality of entries for holding access requests, and the access requests for a cache shared by a plurality of threads being executed at the same time are controlled using the port unit, the access request issued from each tread is registered on a port section of the port unit which is assigned to the tread, thereby controlling the port unit to be divided for use in accordance with the thread configuration. In selecting the access request, the access requests are selected for each thread based on the specified priority control from among the access requests issued from the threads held in the port unit, thereafter a final access request is selected in accordance with a thread selection signal from among those selected access requests. In accordance with such a configuration, the cache access processing can be carried out while reducing the amount of resources of the port unit and assuring effective use of such resources.

6 Claims, 13 Drawing Sheets

U.S. PATENT DOCUMENTS

| | | | |
|---|---|---|---|
| 2004/0194094 A1 | 9/2004 | Qiu et al. | |
| 2004/0210695 A1 | 10/2004 | Weber et al. | |
| 2004/0216113 A1 | 10/2004 | Armstrong et al. | |
| 2005/0210204 A1 | 9/2005 | Yamazaki | |
| 2006/0026594 A1 | 2/2006 | Yoshida et al. | |
| 2007/0283356 A1* | 12/2007 | Du et al. | 718/102 |

FOREIGN PATENT DOCUMENTS

| | | |
|---|---|---|
| JP | 2006-524380 | 10/2006 |
| WO | 2004/068361 A1 | 8/2004 |
| WO | 2004/095282 A1 | 11/2004 |

OTHER PUBLICATIONS

International Preliminary Report on Patentability issued Dec. 22, 2009 in corresponding International Patent Application PCT/JP2007/062325.

English Translation of the International Preliminary Report on Patentability issued Jan. 12, 2010 in corresponding International Patent Application PCT/JP2007/062325.

European Search Report dated Jun. 17, 2011 in corresponding European Patent Application 07767183.2.

* cited by examiner

CACHE CONTROLLER AND CONTROL METHOD FOR CONTROLLING ACCESS REQUESTS TO A CACHE SHARED BY PLURAL THREADS THAT ARE SIMULTANEOUSLY EXECUTED

CROSS-REFERENCE TO RELATED APPLICATION

This application is based upon and claims the benefit of priority of the prior International Application PCT/JP2007/062325 filed on Jun. 19, 2007, the entire contents of which are incorporated herein by reference.

FIELD

The embodiment discussed herein relates to a cache controller and control method used in a processor of an SMT (Simultaneous Multi Thread) system, and, more particularly to a cache controller and control method that make it possible to execute, without simply increasing resources necessary for cache access processing by the number of threads, the cache access processing efficiently using the resources in the processor of the SMT system.

The processor of the SMT system is a processor that simultaneously executes plural threads. In this processor of the SMT system, since a cache is shared by the plural threads, it is necessary to construct cache control having a configuration different from that of cache control used in a processor of a single thread system.

BACKGROUND

FIGS. 12 and 13 illustrates exemplary configuration and flowchart which is studied by the inventor. A configuration of the cache control used in the processor of the single thread system is illustrated in FIG. 12.

Reference sign 100 illustrated in the FIG. 12 denotes an instruction control unit, 200 denotes a cache control unit, 201 denotes a cache RAM, 202 denotes a fetch port (FP), 203 denotes a TOQ (Top-Of-Queue) control circuit, and 204 denotes a priority control circuit.

As illustrated in FIG. 12, requests for cache access from the instruction control unit 100 are once held in the fetch port 202 having plural entries present in the cache control unit 200.

The respective access requests are allocated to the fetch port 202 in order according to the order on a program. Each of entries of the fetch port 202 is circulatingly used. For example, when the fetch port 202 has sixteen entries (FP#0 to FP#15), the respective access requests are allocated in order from FP#0, then, are allocated to FP#0 again after one access request has been allocated to FP#15.

Each of the entries of the fetch port 202 holds one of the access requests until requested cache access processing is completed, then releases the allocated access request at a point when the requested cache access request is completed. An oldest entry number of the fetch port 202 for which the processing is not completed is indicated by a FP-TOQ (Fetch-Port-Top-Of-Queue) output by the TOQ control circuit 23.

When cache access is processed in "out of order", selection of entries of the fetch port 202 that is read out for the cache access processing does not always need to depend on order of allocation of the fetch port 202. Basically, an access request for an arbitrary entry may be selected and processed. However, actually, entries are selected in order of priority provided by the priority control circuit 204.

Control processing in priority order executed by the priority control circuit 204 is illustrated in FIG. 13.

Specifically, when there exist one or more entries for which cache access is never performed yet or for which reprocessing is instructed to respond to an access request which has been put on standby in the fetch port 202 because of cache mistake, sequence guarantee for data and the like, an entry closest to the FP-TOQ among those entries is preferentially selected.

Secondly, when access request is allocated although not satisfying the condition of the first priority order, i.e., when one or more effective entries are present, an entry closest to the FP-TOQ among those entries is preferentially selected.

Such cache control used in the processor of the conventional SMT system is realized by directly using the cache control used in the processor of the single thread system configured as explained above.

Specifically, in the cache control used in the processor of the conventional SMT system, a fetch port having a specified number of entries for each of threads is provided. Access requests having highest priority order are selected for the respective threads according to priority order control illustrated in FIG. 13. An access request is finally selected out of the access requests by performing priority order control among the threads.

As a technique related to the present invention, in Patent Document 1 described below, an invention for realizing guarantee of consistency of execution order for readout and writing of shared data among threads in the processor of the SMT system is described.

Patent Document 1: International Publication WO2004/068361

As described above, the cache control used in the processor of the conventional SMT system is realized by directly using the cache control used in the processor of the single thread system. A fetch port having a specified number of entries for each of threads is provided. Access requests having highest priority order are selected for the respective threads according to priority order control illustrated in FIG. 13. An access request is finally selected out of the access requests by performing priority order control among the threads.

However, according to such a related art, there is a problem in that an increase in resources necessary for the cache access processing is inevitable.

Specifically, when the cache control used in the processor of the conventional SMT system is a cache control used in a processor of a single thread system in which, for example, a fetch port having sixteen entries is used in the processor, if the number of threads is n, n fetch ports having sixteen entries are prepared. Therefore, an increase in resources is inevitable.

Further, in the related art, there is a problem in that resources necessary for the cache access processing are not efficiently used.

Specifically, if explained concerning the case of two threads, it occurs that a frequency of access requests issued by one thread is higher than a frequency of access requests issued by the other thread.

Even when it is known from the beginning that such a situation occurs, in the related art, for example, a fetch port having sixteen entries is prepared for one thread and a fetch port having the same sixteen entries is prepared for the other thread.

Consequently, the fetch port prepared for the thread that issues a small number of access requests has entries more than necessary. Therefore, the fetch port is not efficiently used.

Further, it may occur that frequencies of access requests issued by the threads change according to the progress of data processing.

Even when such a situation occurs, in the related art, a fetch port having a fixed number of entries such as a fetch port having sixteen entries is prepared for the two threads.

Consequently, even when a frequency of access requests issued by one thread increases to be higher than a frequency of access requests issued by the other thread, the fetch port having the same number of entries is used irrespective of the increase in the frequency. Therefore, the fetch port is not efficiently used.

SUMMARY

In order to attain this object, a cache controller according to the present invention is configured to include, in order to control access requests to a cache shared by plural threads that are simultaneously executed. The cache controller comprises (1) a port unit provided in a form shared by the threads, the port unit having plural entries and holding access requests to the entries; (2) a control unit for controlling, by registering access requests issued by each of the threads in port sections of the port unit allocated to the thread, the port unit to be divided and used according to a thread configuration; (3) a first selecting unit provided in association with each of the threads, the first selecting unit receiving, as input, access requests issued by the thread held by the port unit and selecting access requests according to specified priority control; (4) a second selecting unit for receiving, as input, the access requests selected by the first selecting unit and selecting a final access request according to a thread selection signal; (5) a switching unit for switching, when processing of the thread ends, a thread indicated by the thread selection signal from the thread for which the processing ends to another thread; (6) a measuring unit for measuring a frequency of access requests issued by each of the threads; (7) a first determining unit for determining, on the basis of a measurement result of the measuring unit, the port section allocated to each of the threads; (8) a detecting unit for detecting whether the cache controller is in an operation mode in which only one thread operates; and (9) a second determining unit for determining, when the detecting unit detects that the cache controller is in the operation mode in which only one thread operates, that all port sections of the port unit are allocated to the thread.

In the cache controller configured in this way, when access requests are registered in the port unit, access requests issued by each of the threads are registered in a port section of the port unit allocated to the thread. Consequently, the port unit is controlled to be divided and used according to a thread configuration.

When the access requests registered in the port unit are selected, for each of the threads, access requests are selected according to specified priority control out of the access requests issued by the thread held by the port unit. A final access request is selected out of the selected access requests according to a thread selection signal.

In this way, when the cache controller according to the present invention is used in the processor of the SMT system, rather than preparing the port unit for each of the threads, for example, one port unit having sixteen entries is prepared. If explained in a case of two threads, for example, eight entries are allocated to each of the two threads according to a ratio of frequencies of access requests of the two threads or ten entries are allocated to one entry and six entries are allocated to the other thread. In such a way, the port unit is controlled to be divided and used according to a thread configuration.

According to the present invention, cache access processing in the processor of the SMT system can be executed with few resources according to this configuration.

When this configuration is adopted, in the cache controller according to the present invention, when processing for a thread ends, a thread indicated by the thread selection signal is switched from the thread for which the processing ends to another thread.

This makes it possible to prevent occurrence of an inconvenience that only access requests issued by a specific thread are continuously selected.

When this configuration is adopted, in the cache controller according to the present invention, a frequency of access requests issued by each of the threads is measured and a port section allocated to each of the threads is determined on the basis of a result of the measurement.

This makes it possible to allocate a large number of entries to a thread having a high frequency of access requests. Therefore, it is possible to efficiently use the port unit.

When this configuration is adopted, in the cache controller according to the present invention, it is detected whether the cache controller is in an operation mode in which only one thread operates. When it is detected that the cache controller is in the operation mode in which only one thread operates, it is determined that all port sections of the port unit are allocated to the thread.

This makes it possible to allocate, when the cache controller is in the operation mode in which only one thread operates, all entries to the thread. Therefore, it is possible to efficiently use the port unit.

As explained above, according to the present invention, in the processor of the SMT system, it is possible to execute, without increasing resources necessary for cache access processing, the cache access processing efficiently using the resources.

According to the present invention, since it is possible to execute the cache access processing efficiently using the resources, it is possible to improve data processing efficiency of threads.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENT

An embodiment of the present invention is described in detail below according to a mode for carrying out the invention.

Figure 1:
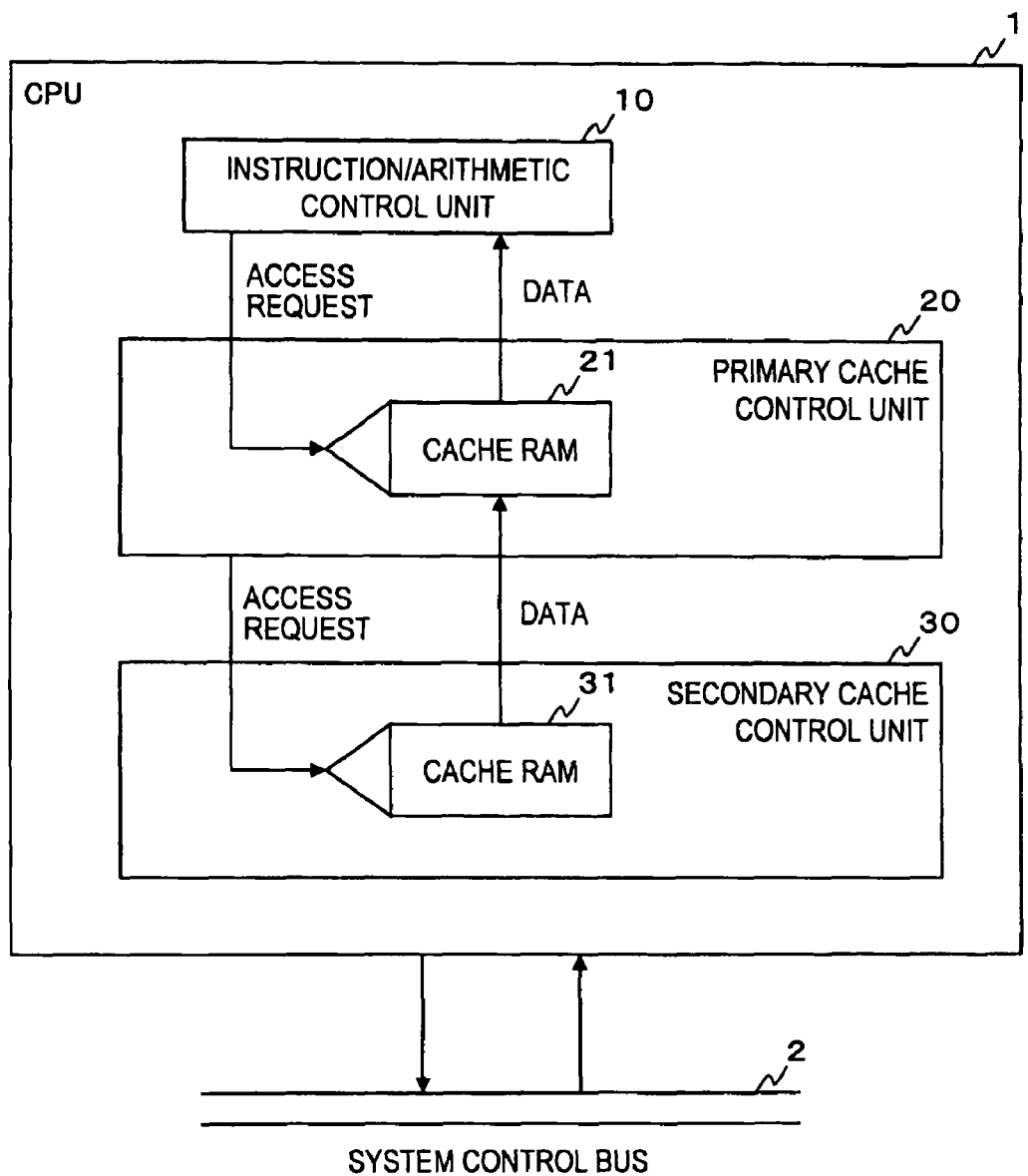
FIG. 1 illustrates a diagram of a CPU to which an embodiment of the present invention is applied.

A configuration of a CPU 1 to which this embodiment is applied is illustrated in FIG. 1.

The CPU 1 to which this embodiment is applied includes an instruction/arithmetic control unit 10, a primary cache control unit 20 and a secondary cache control unit 30. The instruction/arithmetic control unit 10 issues an extraction request for an instruction and a reflection request for arithmetic data. The primary cache control unit 20 has a high-speed and small-capacity cache RAM 21, receives an access request issued by the instruction/arithmetic control unit 10, and executes processing for returning the data to the instruction/arithmetic control unit 10 when data of the access request is stored in the cache RAM 21. The secondary cache control unit 30 has a low-speed and large-capacity cache RAM 31, returns, when the data of the access request issued by the instruction/arithmetic control unit 10 is stored in the cache RAM 31, the data to the instruction/arithmetic control unit 10 and registers the data in the cache RAM 21, and executes, when the data is not stored in the cache RAM 31, processing for requesting a not-illustrated memory to transfer the data via a system control bus 2.

Figure 2:
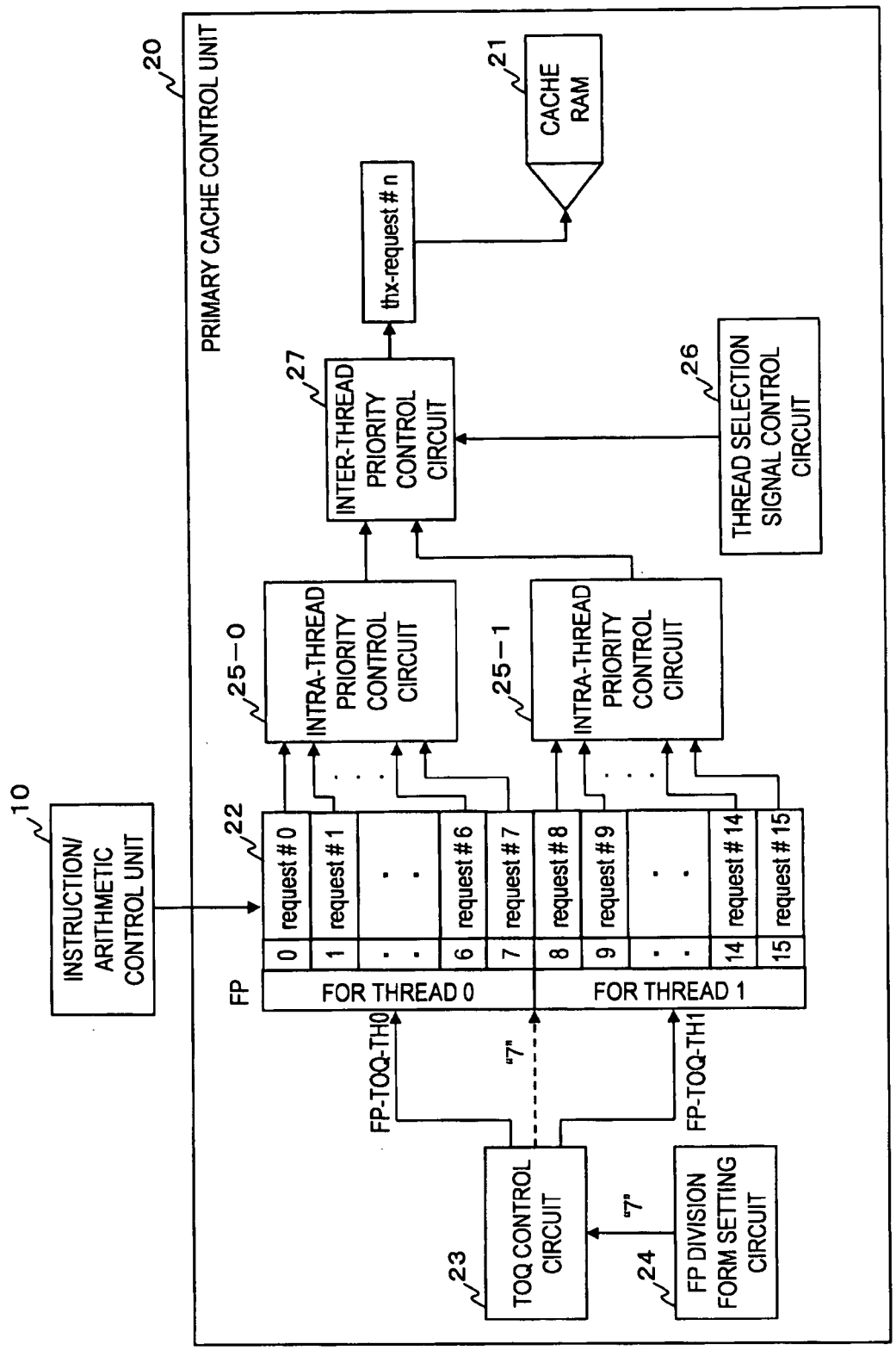
FIG. 2 illustrates an example of a primary cache control unit including the embodiment.

An example of the primary cache control unit 20 including the embodiment is illustrated in FIG. 2.

It is assumed that the primary cache control unit 20 according to this embodiment is mounted on a processor of an SMT system in which two threads, i.e., a thread 0 and a thread 1 operate and that a fetch port having sixteen entries is used.

The primary cache control unit 20 according to this embodiment includes, as illustrated in FIG. 2, a cache RAM 21, a fetch port 22, a TOQ control circuit 23, a FP division form setting circuit 24, an intra-thread priority control circuit 25-0, an intra-thread priority control circuit 25-1, a thread selection signal control circuit 26, and an inter-thread priority control circuit 27.

The fetch port 22 has plural entries. The entries are divided into two groups and used by the TOQ control circuit 23 according to division form set by the FP division form setting circuit 24. Access requests issued by the thread 0 are held in one entry section of the entry and access requests issued by the thread 1 are held in the other entry section.

For example, when the fetch port 22 has sixteen entries (FP#0 to FP#15) and the FP division form setting circuit 24 divides sixteen entries into two groups FP#0 to FP#7 and FP#8 to FP#15, access requests issued by the thread 0 are allocated to FP#0 to FP#7 in order according to the order of a program, eight entries thereof are circulatingly used, access requests issued by the thread 1 are allocated to FP#8 to FP#15 in order according to the order of the program, and eight entries thereof are circulatingly used.

Each of the entries of the fetch port 22 holds access request until requested cache access processing is completed and releases the access request at a point when the requested cache access processing is completed.

The TOQ control circuit 23 is provided in a form shared by the thread 0 and the thread 1 and controls the entries of the fetch port 22 to be divided into two groups and used according to a division form set by the FP division form setting circuit 24. The TOQ control circuit 23 indicates, with FP-TOQ-TH0, an entry number of the fetch port 22 that holds an oldest access request for which processing is not completed among the access requests issued by the thread 0 and indicates, with FP-TOQ-TH1, an entry number of the fetch port 22 that holds an oldest access request for which processing is not completed among the access requests issued by the thread 1.

The FP division form setting circuit 24 determines, for example, before staring operation, a division form of the fetch port 22 according to a ratio of loads of access requests issued by the threads 0 and 1 (a ratio of frequencies of the access requests) and notifies the TOQ control circuit 23 of the division form. For example, the FP division form setting circuit 24 determines that the entries of the fetch port 22 are divided into two groups FP#0 to FP#7 and FP#8 to FP#15 and notifies the TOQ control circuit 23 of the division.

The intra-thread priority control circuit 25-0 is provided in association with the thread 0, selects an entry of the fetch port 22 for cache access processing requested by the thread 0, and extracts an access request from the entry.

The intra-thread priority control circuit 25-1 is provided in association with the thread 1, selects an entry of the fetch port 22 for cache access processing requested by the thread 1, and extracts an access request from the entry.

The thread selection signal control circuit 26 generates a thread selection signal (thread-select) for displaying "0" when the thread 0 is prioritized and displays "1" when the thread 1 is prioritized.

The inter-thread priority control circuit 27 selects, when priority order has to be determined between the threads, an access request output by the intra-thread priority control circuit 25-0 or selects an access request output by the intra-thread priority control circuit 25-1 according to a thread selection signal generated by the thread selection signal control circuit 26 and indexes the cache RAM 21 according to the selected access request.

Figure 3:
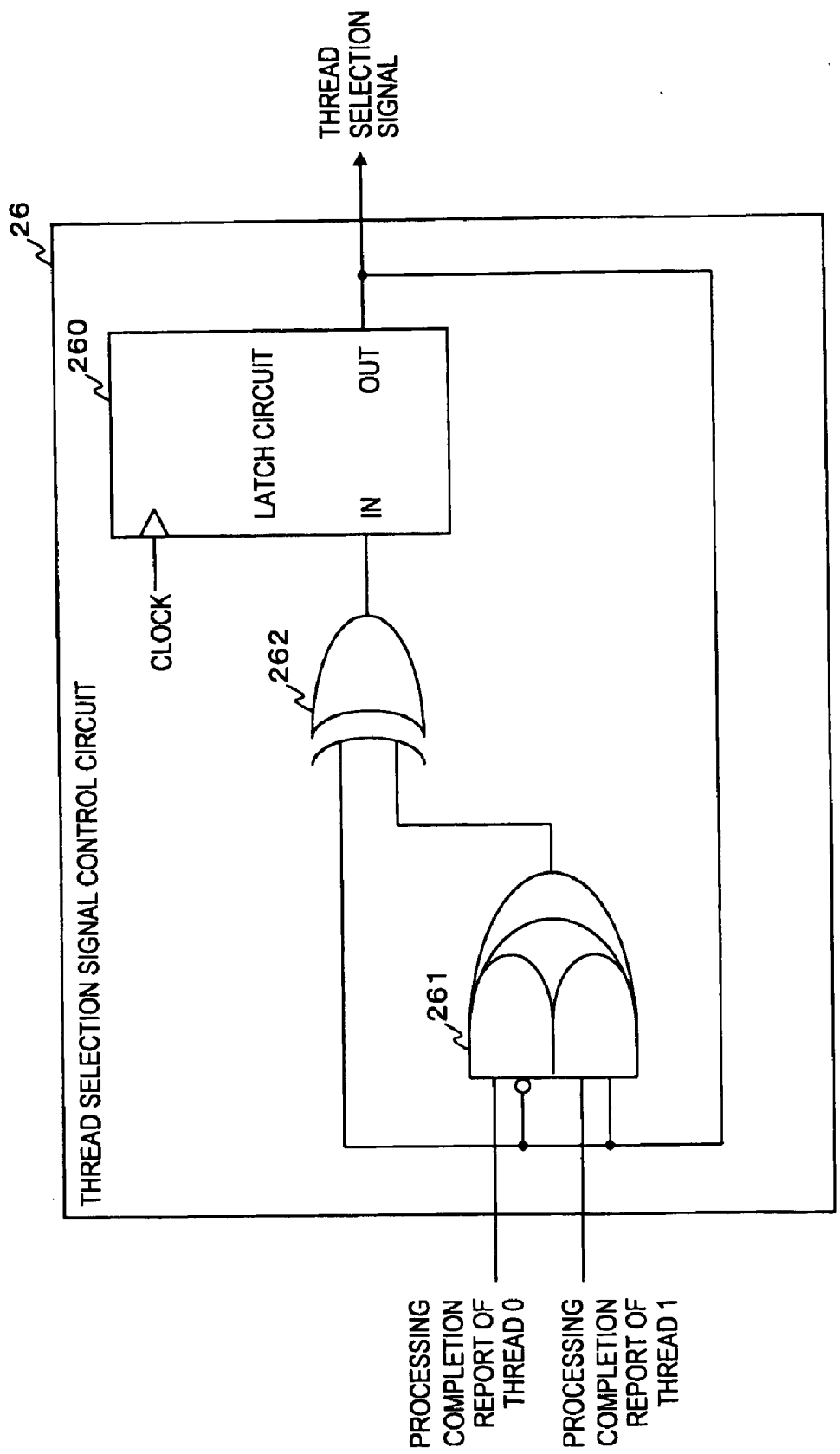
FIG. 3 illustrates a diagram of a thread selection signal control circuit.

A configuration example of the thread selection signal control circuit 26 is illustrated in FIG. 3.

The thread selection signal control circuit 26 includes, as illustrated in FIG. 3, a latch circuit 260, a first logic circuit 261 and a second logic circuit 262. The latch circuit 260 holds and outputs a thread selection signal. The first logic circuit 261 includes two AND gates and one OR gate and outputs "1" when the latch circuit 260 outputs "0" and a processing completion report (having a value "1") of the thread 0 is notified and outputs "0" when the latch circuit 260 outputs "1" and a processing completion report (having a value "1") of the thread 1 is notified. The second logic circuit 262 includes an EOR gate, calculates an exclusive OR value of an output signal of the latch circuit 260 and an output signal of the first logic circuit 261, and gives the exclusive OR value to the latch circuit 260.

According to the above described configuration, the thread selection signal control circuit 26 performs control to switch a thread indicated by the thread selection signal from the thread "0" to the thread "1" when the processing of the thread "0" ends and switch the thread indicated by the thread selection signal from the thread "1" to the thread "0" when the processing of the thread 1 ends. Consequently, the thread selection signal control circuit 26 performs control to prevent cache access processing of any one of the threads from continuing losing during priority determination by conflict between the threads.

Figure 4:
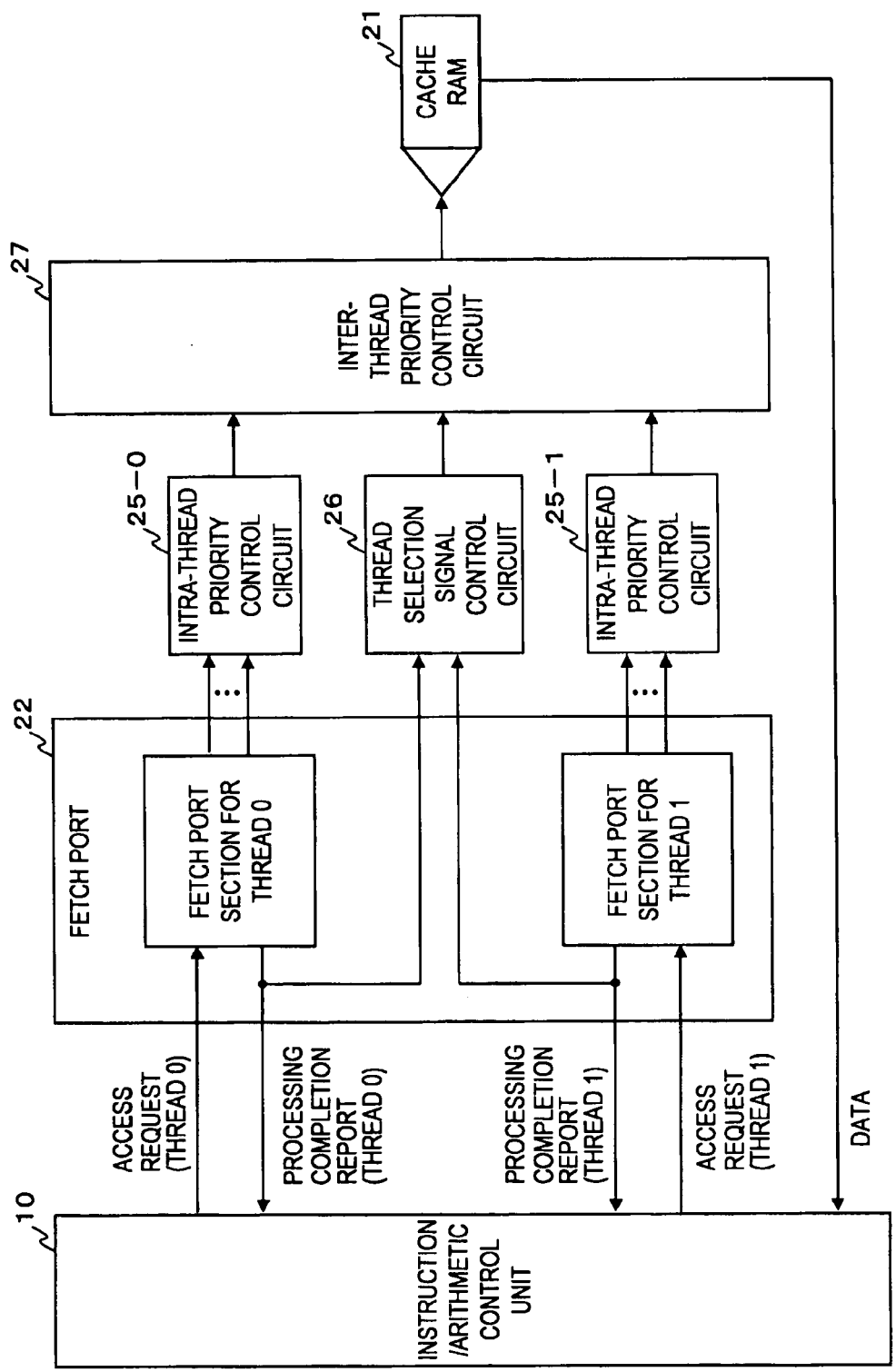
FIG. 4 illustrates an explanatory diagram of a thread processing completion report input to the thread selection signal control circuit.

As illustrated in FIG. 4, the processing completion report for the thread 0 notified from the fetch port 22 to the instruction/arithmetic control unit 10 is input to the thread selection signal control circuit 26. The processing completion report for the thread 1 notified from the fetch port 22 to the instruction/arithmetic control unit 10 is also input to the thread selection signal control circuit 26.

The thread selection signal generated by the thread selection signal control circuit 26 is a signal for determining a processing target thread when conflict for simultaneously performing access request processing and resource acquisition occurs between the threads. In this example, the thread selection signal control circuit 26 performs control using a completion signal for processing of memory access allocated to the fetch port 22, i.e., a release signal for the entries of the fetch port 22. For example, in a load instruction, processing is regarded as completed upon transfer of target data to the instruction/arithmetic control unit 10. In a store instruction, processing is regarded as completed when order control is guaranteed.

Figure 5:
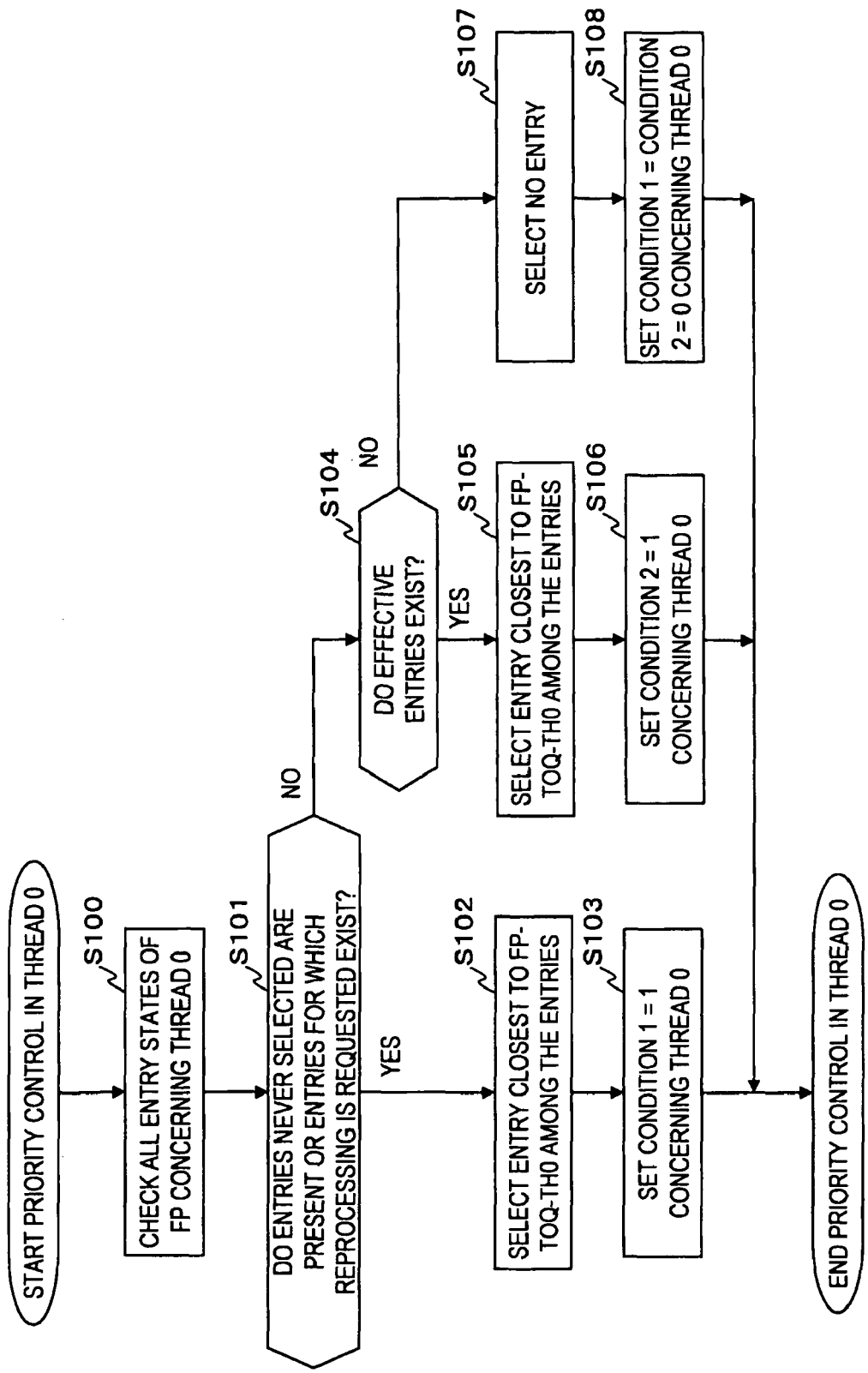
FIG. 5 illustrates a flowchart executed by an intra-thread priority control circuit.
Figure 6:
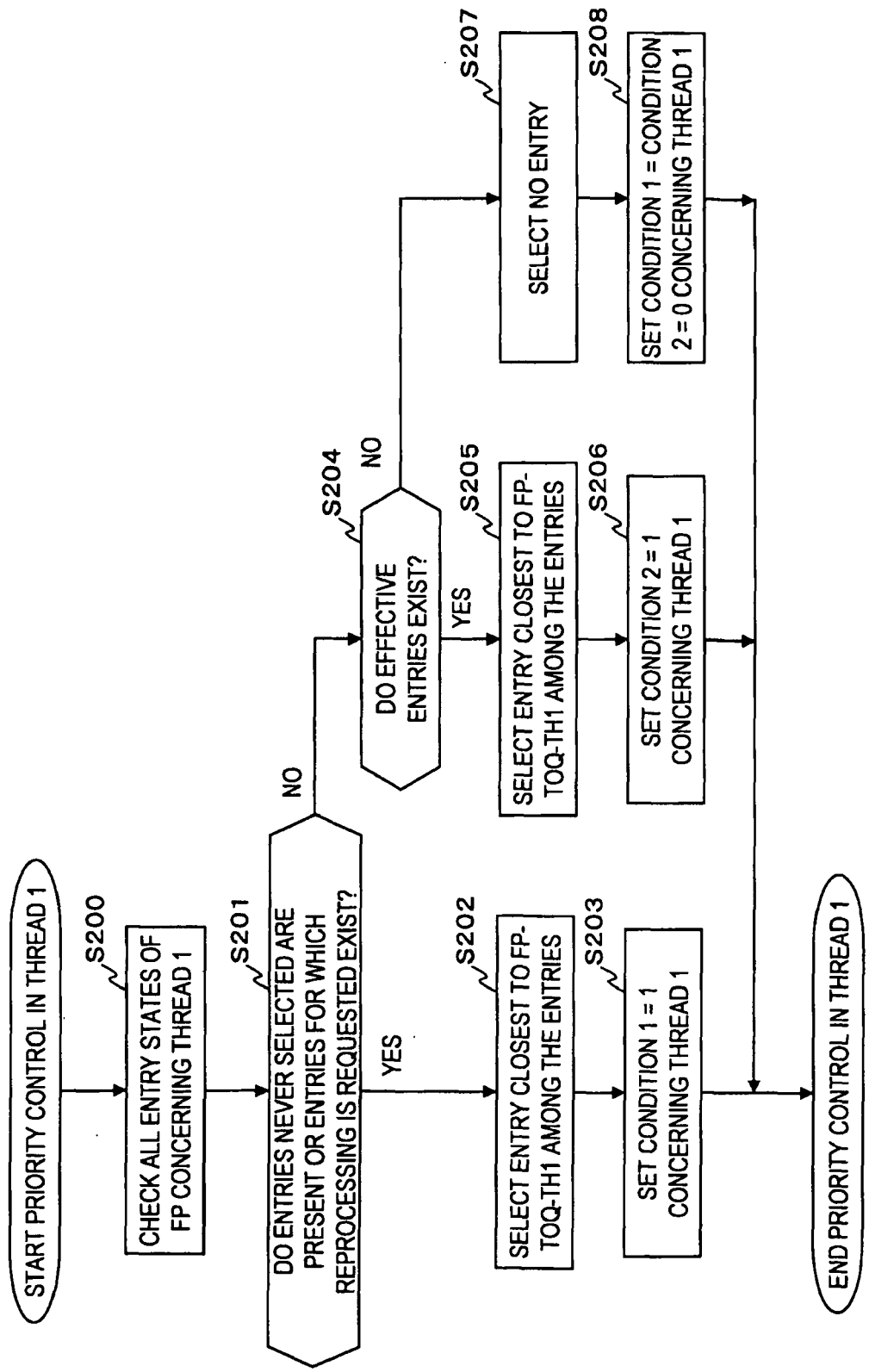
FIG. 6 illustrates a flowchart executed by the intra-thread priority control circuit.
Figure 7:
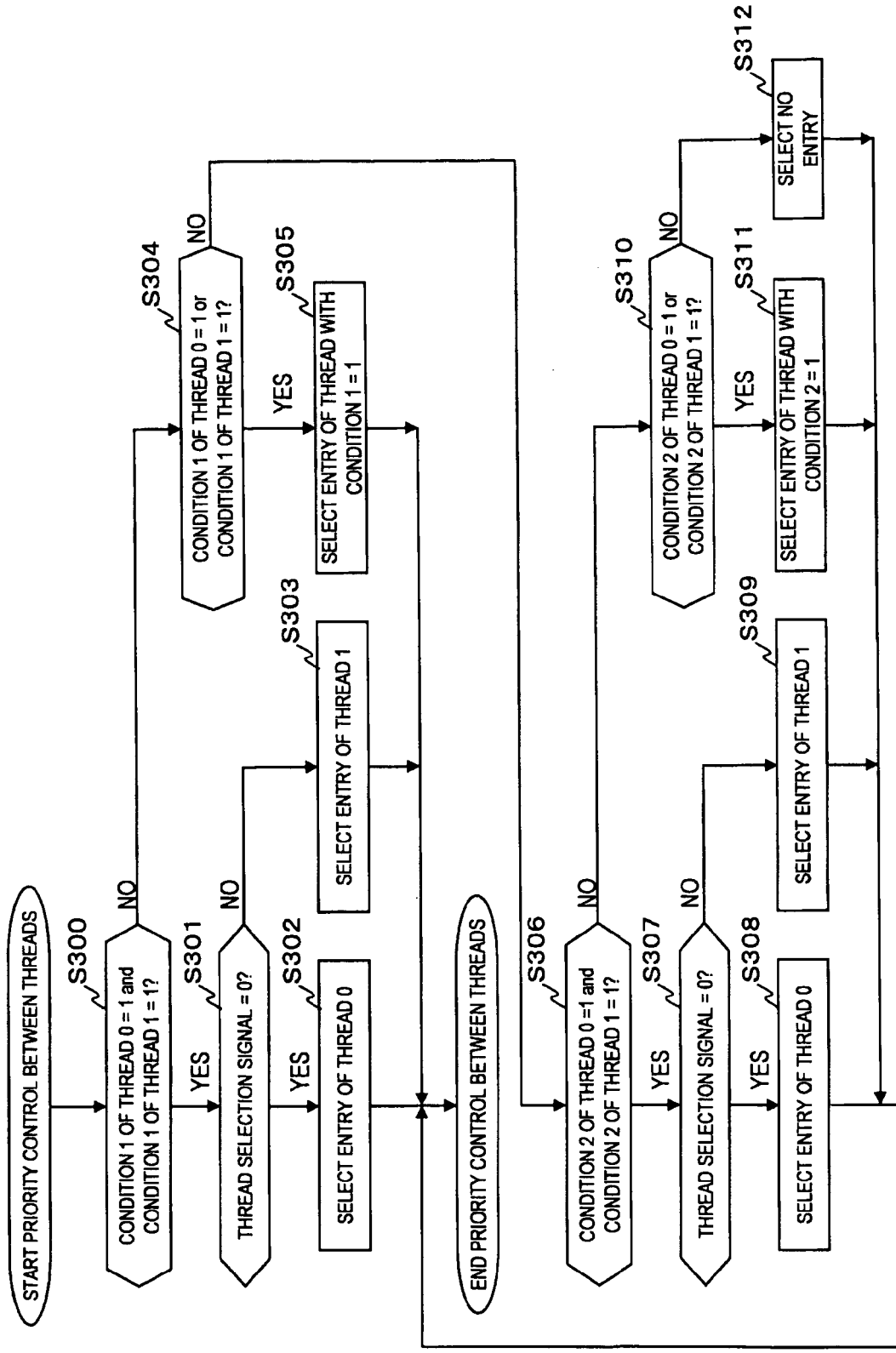
FIG. 7 illustrates a flowchart executed by the inter-thread priority control circuit.

In FIG. 5, processing executed by the intra-thread priority control circuit 25-0 is illustrated in a flowchart form. In FIG. 6, processing executed by the intra-thread priority control circuit 25-1 is illustrated in a flowchart form. In FIG. 7, processing executed by the inter-thread priority control circuit 27 is illustrated in a flowchart form.

Next, processing executed by the primary cache control unit 20 configured as illustrated in FIG. 2 is described in detail with reference to these flowcharts.

When the intra-thread priority control circuit 25-0 starts priority control processing for access requests issued by the thread 0 held in the fetch port 22, as illustrated in the flowchart of FIG. 5, first, in step S100, the intra-thread priority control circuit 25-0 checks all entry states of a port section of the fetch port 22 for the thread 0.

Subsequently, in step S101, according to this check processing, the intra-thread priority control circuit 25-0 determines whether there exist one or more entries for which cache access is never performed yet or entries for which reprocessing instructed to respond to an access request put on standby in the fetch port 202 because of cache mistake, sequence guarantee for data, and the like.

When it is determined in the determination processing in step S101 that one or more relevant entries exist, the intra-thread priority control circuit 25-0 proceeds to step S102 and selects an entry closest to an entry indicated by FP-TOQ-TH0 output by the TOQ control circuit 23 among the entries. In the subsequent step S103, the intra-thread priority control circuit 25-0 sets "1" in a variable of a condition 1 concerning the thread 0 and ends the priority control processing.

On the other hand, when it is determined in the determination processing in step S101 that one or more relevant entries do not exist, the intra-thread priority control circuit 25-0 proceeds to step S104 and determines whether there exist one or more effective entries (entries to which access requests are allocated).

When it is determined in the determination processing in step S104 that one or more relevant entries exist, the intra-thread priority control circuit 25-0 proceeds to step S105 and selects an entry closest to the entry indicated by FP-TOQ-TH0 output by the TOQ control circuit 23 among the entries. In the subsequent step S106, the intra-thread priority control circuit 25-0 sets "1" in a variable of a condition 2 concerning the thread 0 and ends the priority control processing.

On the other hand, when it is determined in the determination processing in step S104 that one or more effective entries do not exist, the intra-thread priority control circuit 25-0 proceeds to step S107 and selects no entry. In the subsequent step S108, the intra-thread priority control circuit 25-0 sets "0" in the variable of the condition 1 concerning the thread 0, sets "0" in the variable of the condition 2 concerning the thread 0, and ends the priority control processing.

In this way, with the access requests issued by the thread 0 held in the fetch port 22 set as processing targets, when there exist one or more entries for which cache access is never performed yet or entries for which reprocessing is instructed to respond to an access request put on standby in the fetch port 202 because of cache mistake, sequence guarantee for data and the like, the intra-thread priority control circuit 25-0 preferentially selects an entry closest to the entry indicated by FP-TOQ-TH0 among the entries. When there exist one or more entries to which access requests are allocated although not satisfying this condition of priority order, i.e., effective entries, the intra-thread priority control circuit 25-0 preferentially selects an entry closest to the entry indicated by FP-TOQ-TH0 among the entries.

On the other hand, when the intra-thread priority control circuit 25-1 starts priority control processing for access requests issued by the thread 1 held in the fetch port 22, as illustrated in the flowchart of FIG. 6, first, in step S200, the intra-thread priority control circuit 25-1 checks all entry states of a port section of the fetch port 22 for the thread 1.

Subsequently, in step S201, according to this check processing, the intra-thread priority control circuit 25-1 determines whether there exist one or more entries for which cache access is never performed yet or entries for which reprocessing is instructed to respond to an access request put on standby in the fetch port 22 because of cache mistake, sequence guarantee for data, and the like.

When it is determined in the determination processing in step S201 that one or more relevant entries exist, the intra-thread priority control circuit 25-1 proceeds to step S202 and selects an entry closest to an entry indicated by FP-TOQ-TH1 output by the TOQ control circuit 23 among the entries. In the subsequent step S203, the intra-thread priority control circuit 25-1 sets "1" in a variable of a condition 1 concerning the thread 1 and ends the priority control processing.

On the other hand, when it is determined in the determination processing in step S201 that one or more relevant entries do not exist, the intra-thread priority control circuit 25-1 proceeds to step S204 and determines whether there exist one or more effective entries (entries to which access requests are allocated).

When it is determined in the determination processing in step S204 that one or more relevant entries exist, the intra-thread priority control circuit 25-1 proceeds to step S205 and selects an entry closest to the entry indicated by FP-TOQ-TH1 output by the TOQ control circuit 23 among the entries. In the subsequent step S206, the intra-thread priority control circuit 25-1 sets "1" in a variable of a condition 2 concerning the thread 1 and ends the priority control processing.

On the other hand, when it is determined in the determination processing in step S204 that one or more effective entries do not exist, the intra-thread priority control circuit 25-1 proceeds to step S207 and selects no entry. In the subsequent step S208, the intra-thread priority control circuit 25-1 sets "0" in the variable of the condition 1 concerning the thread 1, sets "0" in the variable of the condition 2 concerning the thread 1, and ends the priority control processing.

In this way, with the access requests issued by the thread 1 held in the fetch port 22 set as processing targets, when there exist one or more entries for which cache access is never performed yet or entries for which reprocessing is instructed to respond to an access request put on standby in the fetch port 22 because of cache mistake, sequence guarantee for data, and the like, the intra-thread priority control circuit 25-1 preferentially selects an entry closest to the entry indicated by FP-TOQ-TH1 among the entries. When there exist one or more entries to which access requests are allocated although not satisfying this condition of priority order, i.e., effective entries, the intra-thread priority control circuit 25-1 preferentially selects an entry closest to the entry indicated by FP-TOQ-TH1 among the entries.

Next, processing executed by the inter-thread priority control circuit 27 is described.

When the inter-thread priority control circuit 27 starts priority control processing between the threads as the intra-thread priority control circuits 25-0 and 25-1 end the priority control processing, as illustrated in the flowchart of FIG. 7, first, in step S300, the inter-thread priority control circuit 27 determines whether "1" is set in the variable of the condition 1 concerning the thread 0 and "1" is set in the variable of the condition 1 concerning the thread 1.

When it is determined in the determination processing in step S300 that "1" is set in the variable of the condition 1 concerning the thread 0 and "1" is set in the variable of the condition 1 concerning the thread 1, the inter-thread priority control circuit 27 proceeds to step S301 and determines whether a thread selection signal generated by the thread selection signal control circuit 26 indicates "0". When it is determined that the thread selection signal indicates "0", the inter-thread priority control circuit 27 proceeds to step S302, selects an entry output by the intra-thread priority control circuit 25-0 to select an entry of the thread 0, and ends the priority control processing between the threads.

On the other hand, when it is determined in the determination processing in step S301 that the thread selection signal indicates "1" rather than "0", the inter-thread priority control circuit 27 proceeds to step S303, selects an entry output by the intra-thread priority control circuit 25-1 to select an entry of the thread 1, and ends the priority control processing between the threads.

On the other hand, when it is determined in the determination processing in step S300 that two conditions, i.e., a condition that "1" is set in the variable of the condition 1 concerning the thread 0 and a condition that "1" is set in the variable of the condition 1 concerning the thread 1 are not simultaneously satisfied, the inter-thread priority control circuit 27 proceeds to step S304 and determines whether one of the two conditions is satisfied.

When it is determined in the determination processing in step S304 that one of the condition that "1" is set in the variable of the condition 1 concerning the thread 0 and the condition that "1" is set in the variable of the condition 1 concerning the thread 1 is satisfied, the inter-thread priority control circuit 27 proceeds to step S305, selects an entry output by the intra-thread priority control circuit 25-0 or 25-1, in the variable of the condition 1 of which "1" is set, to select an entry of the thread 0 or the thread 1, and ends the priority control processing between the threads.

On the other hand, when it is determined in the determination processing in step S304 that both the condition that "1" is set in the variable of the condition 1 concerning the thread 0 and the condition that "1" is set in the variable of the condition 1 concerning the thread 1 are not satisfied, the inter-thread priority control circuit 27 proceeds to step S306 and determines whether "1" is set in the variable of the condition 2 concerning the thread 0 and "1" is set in the variable of the condition 2 concerning the thread 1.

When it is determined in the determination processing in step S306 that "1" is set in the variable of the condition 2 concerning the thread 0 and "1" is set in the variable of the condition 2 concerning the thread 1, the inter-thread priority control circuit 27 proceeds to step S307 and determines whether a thread selection signal generated by the thread selection signal control circuit 26 indicates "0". When it is determined that the thread selection signal indicates "0", the inter-thread priority control circuit 27 proceeds to step S308, selects an entry output by the intra-thread priority control circuit 25-0 to select an entry of the thread 0, and ends the priority control processing between the threads.

On the other hand, when it is determined in the determination processing in step S307 that the thread selection signal indicates "1" rather than "0", the inter-thread priority control circuit 27 proceeds to step S309, selects an entry output by the intra-thread priority control circuit 25-1 to select an entry of the thread 1, and ends the priority control processing between the threads.

On the other hand, when it is determined in the determination processing in step S306 that two conditions, i.e., a condition that "1" is set in the variable of the condition 2 concerning the thread 0 and a condition that "1" is set in the variable of the condition 2 concerning the thread 1 are not simultaneously satisfied, the inter-thread priority control circuit 27 proceeds to step S310 and determines whether one of the two conditions is satisfied.

When it is determined in the determination processing in step S310 that one of the condition that "1" is set in the variable of the condition 2 concerning the thread 0 and the condition that "1" is set in the variable of the condition 2 concerning the thread 1 is satisfied, the inter-thread priority control circuit 27 proceeds to step S311, selects an entry output by the intra-thread priority control circuit 25-0 or 25-1, in the variable of the condition 2 of which "1" is set, to select an entry of the thread 0 or the thread 1, and ends the priority control processing between the threads.

On the other hand, when it is determined in the determination processing in step S310 that both the condition that "1" is set in the variable of the condition 2 concerning the thread 0 and the condition that "1" is set in the variable of the condition 2 concerning the thread 1 are not satisfied, the inter-thread priority control circuit 27 proceeds to step S312, selects no entry, and ends the priority control processing between the threads.

In this way, in the primary cache control unit 20 according to this embodiment configured as illustrated in FIG. 2, when the primary cache control unit 20 is used in the processor of the SMT system, rather than preparing the fetch port 22 for each of the threads 0 and 1, for example, one fetch port 22 having sixteen entries is prepared. Eight entries are allocated to each of the two threads or ten entries are allocated to one thread and six entries are allocated to the other threads. In such a way, the primary cache control unit 20 controls the fetch port 22 to be divided and used according to a thread configuration.

According to this embodiment, this configuration allows cache access processing in the processor of the SMT system to be executed with few resources.

In the primary cache control unit 20 configured as illustrated in FIG. 2, the FP division form setting circuit 24 determines, for example, before starting operation, a division form of the fetch port 22 according to a ratio of loads of access requests issued by the threads 0 and 1 (a ratio of frequencies of the access requests) and notifies the TOQ control circuit 23 of the division form.

When this configuration is adopted, when the division form of the fetch port 22 is determined once, the division form is not changed after that.

However, when a ratio of loads of access requests issued by the threads 0 and 1 changes as time elapses according to the progress of data processing, in order to make a maximum number of entries that each of the threads can use variable, it is preferable to dynamically change the division form of the fetch port 22 according to the ratio of the loads.

Figure 8:
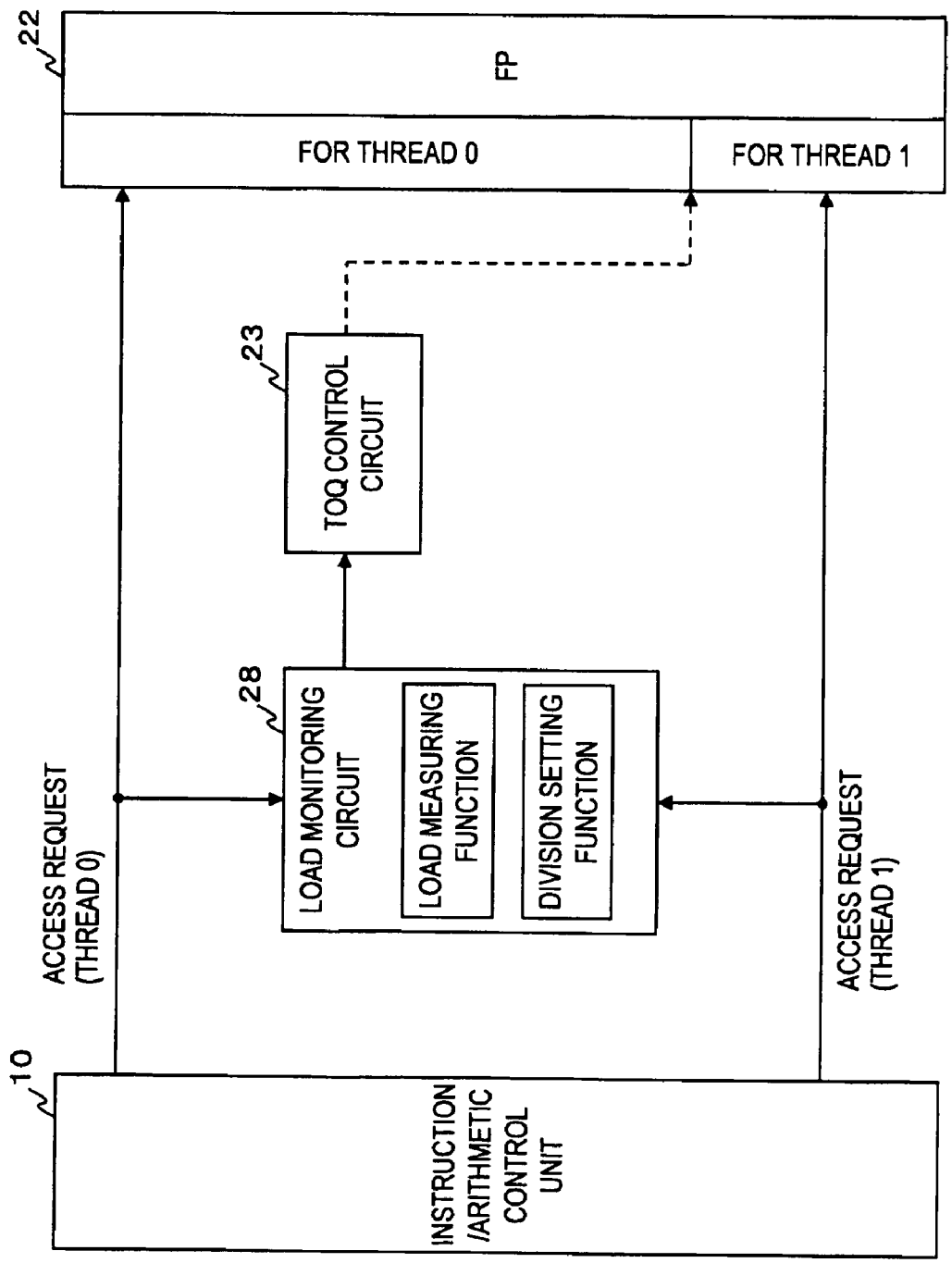
FIG. 8 illustrates an explanatory diagram of a load monitoring circuit.

To realize this, as illustrated in FIG. 8, a load monitoring circuit 28 that monitors loads of access requests issued by the thread 0 and loads of access requests issued by the thread 1 is provided. Loads of access requests of the two threads 0 and 1 are continuously measured with, for example, predetermined time T set as a unit by using this load monitoring circuit 28. A division form of the fetch port 22 at the next time T is determined on the basis of the loads and notified to the TOQ control circuit 23.

Figure 9:
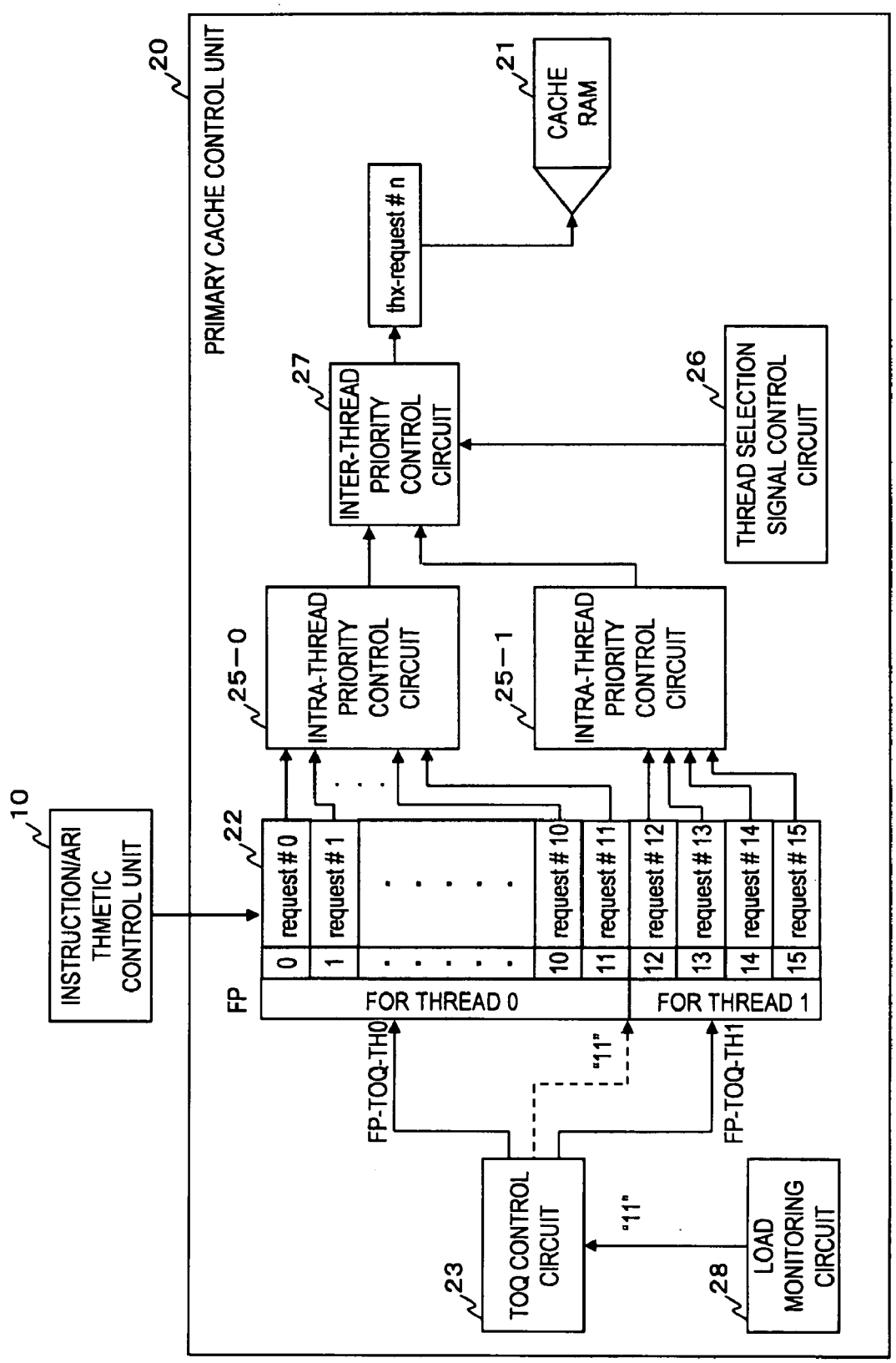
FIG. 9 illustrates an explanatory diagram of a state of use of a fetch port in the case in which the load monitoring circuit is provided.

When this configuration is adopted, as illustrated in FIG. 9, a larger number of entries are allocated to a thread having larger loads of access requests (in an example of this figure, the thread 0). Therefore, the fetch port 22 can be efficiently used.

For example, when a ratio of loads of access requests is 3:1 in the thread 0 and the thread 1, the access requests of the thread 0 are allocated to twelve entries in total FP#0 to FP#11 and the access requests of the thread 1 are allocated to four entries in total FP#12 to FP#15. Consequently, entries not fully used in a thread having light loads can be used in a thread having heavy loads. Therefore, it is possible to improve efficiency of use of entries of the fetch port 22.

Although not explained with reference to FIG. 2, only a single thread may operate in the processor of the SMT system. In such a case, the instruction/arithmetic control unit 10 transmits a single thread mode signal.

Figure 10:
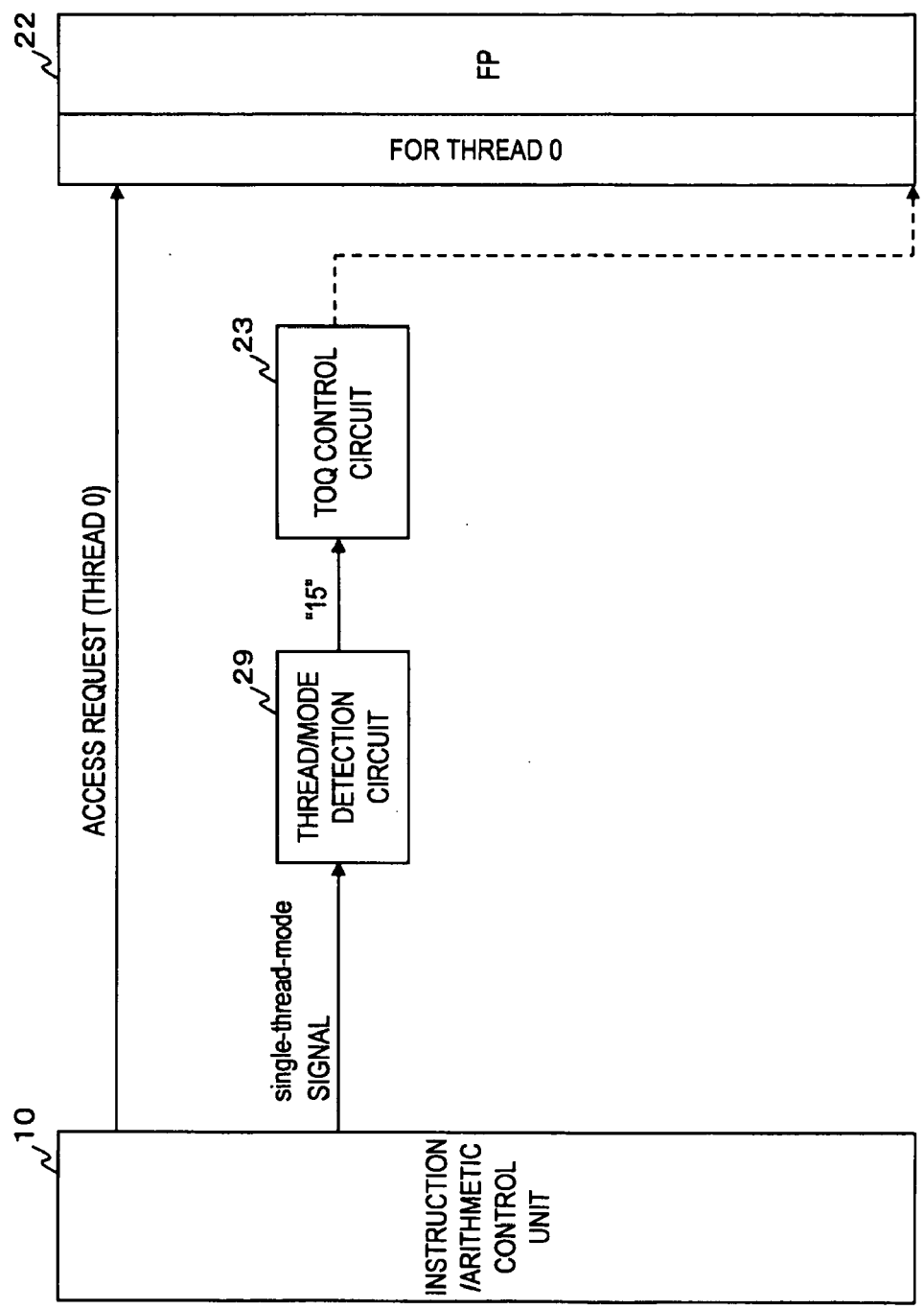
FIG. 10 illustrates an explanatory diagram of a thread mode detection circuit.

Therefore, as illustrated in FIG. 10, a thread/mode detection circuit 29 that detects the transmission of the single thread mode signal is provided. When it is detected by using this thread/mode detection circuit 29 that the single thread mode signal is transmitted from the instruction/arithmetic control unit 10, it is determined that the fetch port 22 is not divided and the determination is notified to the TOQ control circuit 23.

Figure 11:
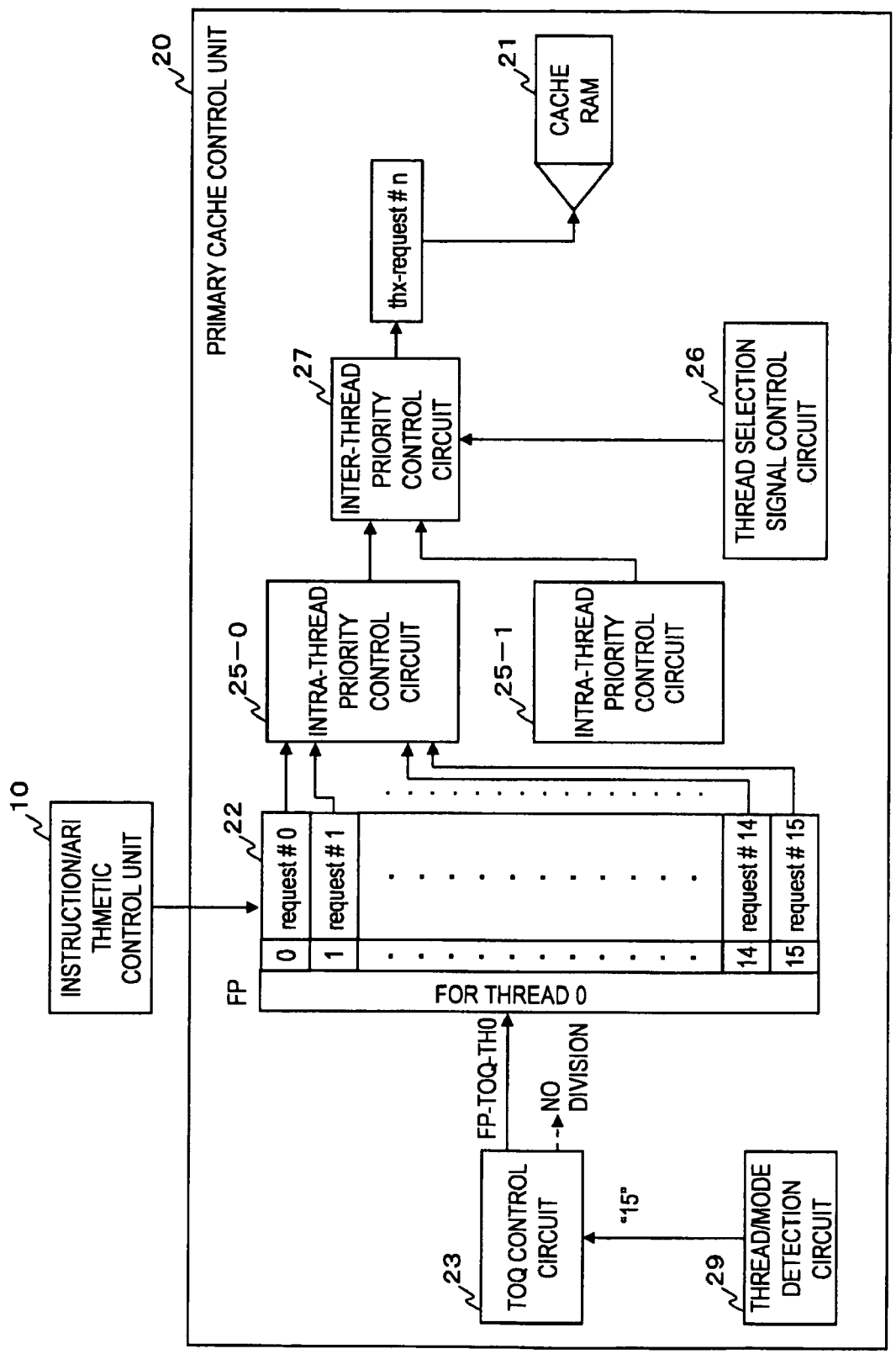
FIG. 11 illustrates an explanatory diagram of a state of use of a fetch port in the case in which the thread mode detection circuit is provided.
Figure 12:
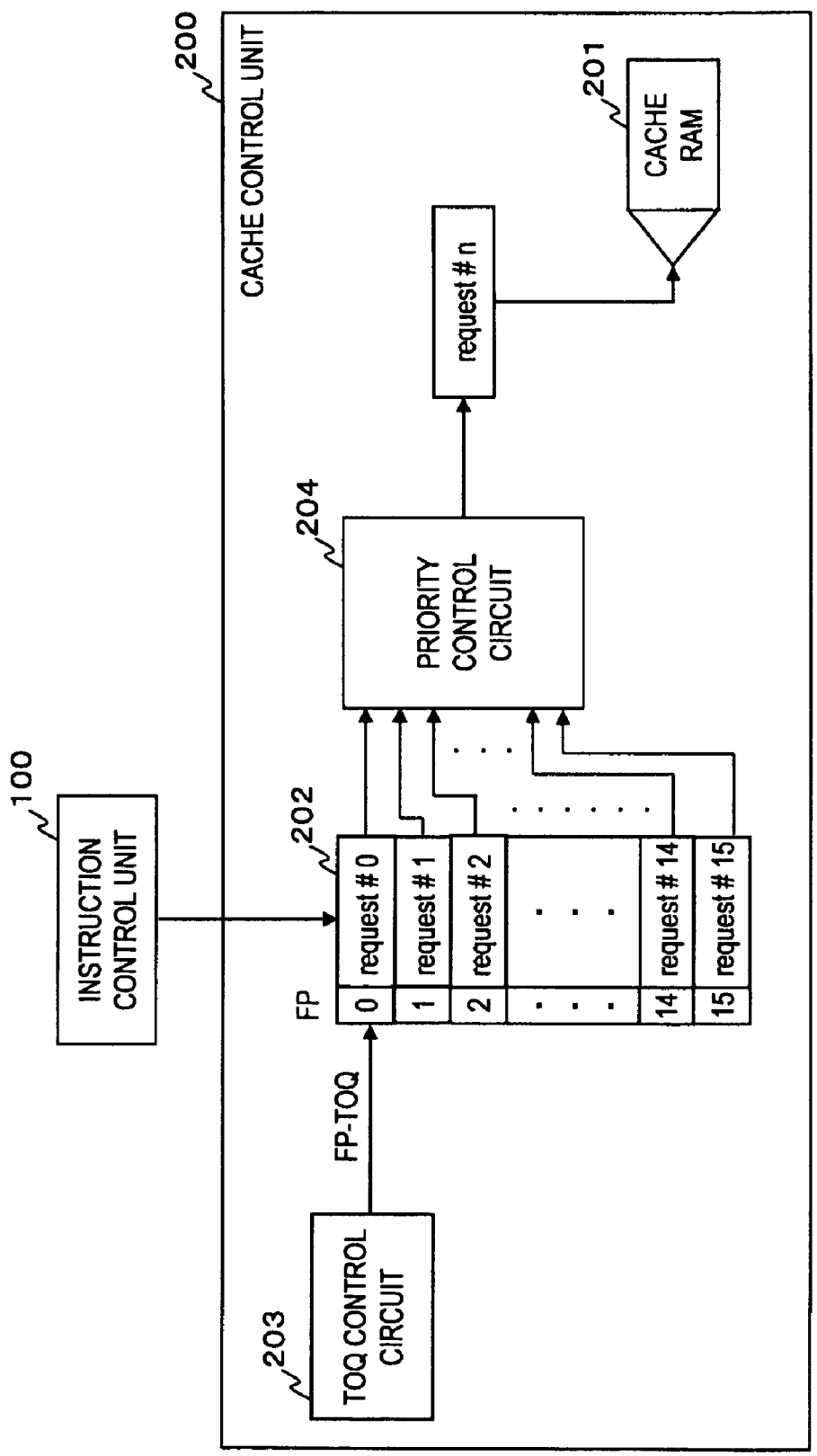
FIG. 12 illustrates a diagram of cache control used in a processor of a single thread system.
Figure 13:
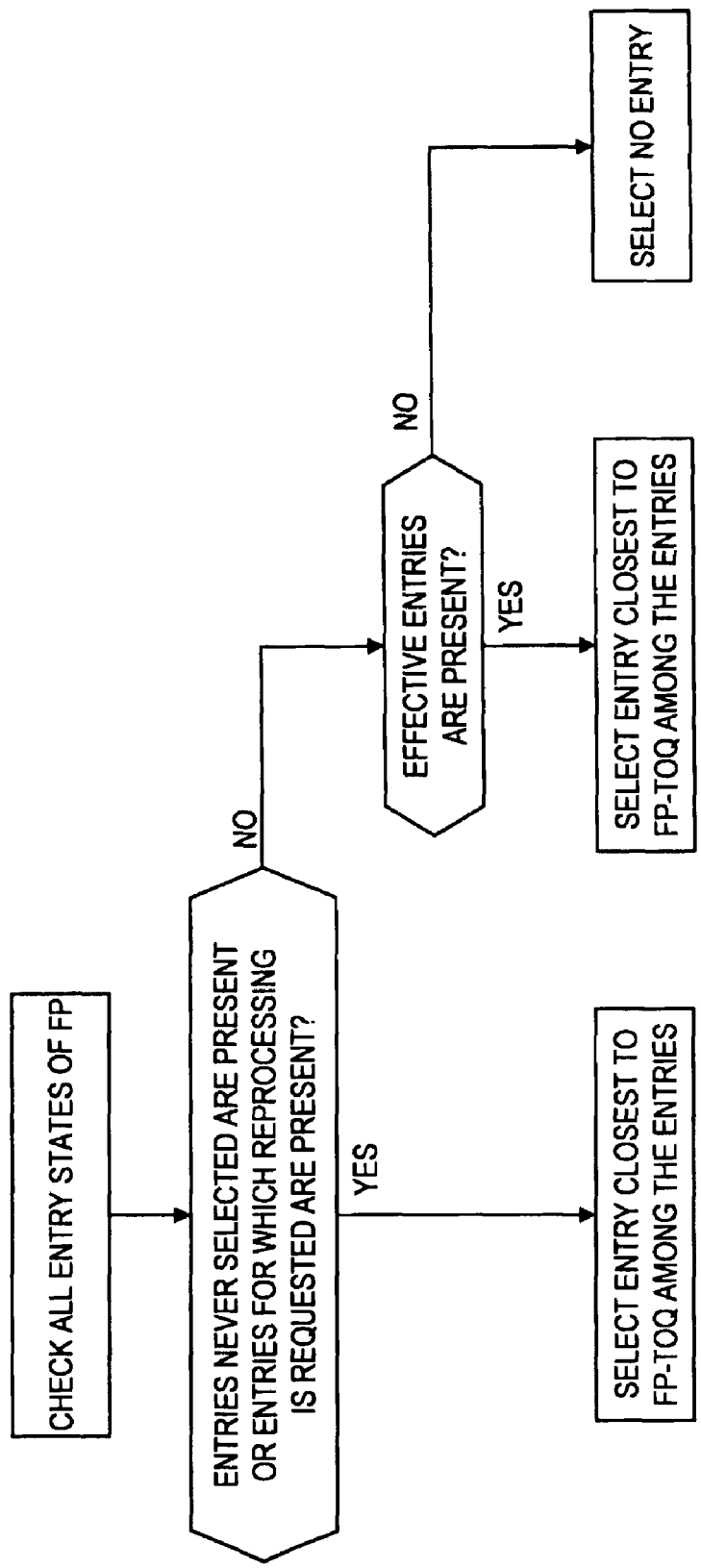
FIG. 13 illustrates a flowchart of priority order control for entry selection of a fetch port used in the processor of the single thread system.

When this configuration is adopted, as illustrated in FIG. 11, when only a single thread operates, one thread can use all the entries of the fetch port 22. Therefore, efficiency of use of the entries of the fetch port 22 can be improved.

The cache controller and control method are explained above according to the embodiment illustrated in the figures. However, the cache controller and control method are not limited to this. For example, in the embodiment, it is assumed that the cache controller is mounted on the processor of the SMT system in which the two threads operate. However, the cache controller can also be directly applied when three or more threads operate.

The present invention can be applied to cache control in the processor of the SMT system. By applying the present invention, it is possible to execute, without increasing resources necessary for cache access processing, the cache access processing efficiently using the resources in the processor of the SMT system.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A cache controller that controls access requests to a cache shared by plural threads that are simultaneously executed, the cache controller comprising:
    a port unit provided in a form shared by a plurality of threads, the port unit having plural entries and holding access requests to the entries;
    a measuring unit to measure a frequency of access requests issued by each of the threads;
    a control unit to divide the port unit dynamically into one or a plurality of port sections based on a measurement result of the measuring unit, allocating the threads into the divided one or the plurality of port sections respectively, registering an access request issued by one of the threads with a port section allocated to an issuer thread;
    a first selecting unit provided in association with each of the threads, the first selecting unit receiving, as input, access requests registered with one of the port sections and selecting an access request among the received access requests according to a specified priority control; and
    a second selecting unit to receive, as input, the access requests selected by the first selecting unit and selecting a final access request among the selected access requests according to a thread selection signal.

2. The cache controller according to claim 1, comprising a switching unit to switch a thread indicated by the thread selection signal from the thread for which the processing ends to another thread, when processing of the thread ends.

3. The cache controller according to claim 1, comprising:
    a detecting unit to detect whether the cache controller is in an operation mode in which only one thread operates; and
    a second determining unit to determine, when the detecting unit detects that the cache controller is in the operation mode in which only one thread operates, that all port sections of the port unit are allocated to the thread.

4. A cache control method executed by a cache controller that includes a port unit provided in a form shared by a plurality of threads, the port unit having plural entries and holding access requests to each of the entries, and controls, using the port unit, access requests to a cache shared by the plural threads that are simultaneously executed, the cache control method comprising:
    measuring a frequency of access requests issued by each of the threads;
    dividing the port unit dynamically into one or a plurality of port sections based on a measurement result of the measuring unit, and allocating the threads into the divided one of the plurality of port sections respectively;
    registering an access request issued by one of the threads with a port section allocated to an issuer thread;
    selecting, for each of the threads, an access request according to a specified priority control out of access requests issued by the thread held by the port unit; and
    selecting a final access request according to a thread selection signal out of the selected access requests.

5. The cache control method according to claim 4, comprising switching a thread indicated by the thread selection signal from the thread for which the processing ends to another thread, when processing for the thread ends.

6. The cache control method according to claim 4, comprising detecting whether the cache controller is in an operation mode in which only one thread operates and, when it is detected that the cache controller is in the operation mode in which only one thread operates, determining that all port sections of the port unit are allocated to the thread.

* * * * *

UNITED STATES PATENT AND TRADEMARK OFFICE
CERTIFICATE OF CORRECTION

PATENT NO. : 8,412,886 B2
APPLICATION NO. : 12/654310
DATED : April 2, 2013
INVENTOR(S) : Naohiro Kiyota Page 1 of 1

It is certified that error appears in the above-identified patent and that said Letters Patent is hereby corrected as shown below:

On the Title Page Col. 2 Item 57 (Abstract), Line 6, Delete "tread" and insert -- thread --, therefor.

On the Title Page Col. 2 Item 57 (Abstract), Line 7, Delete "tread," and insert -- thread, --, therefor.

Signed and Sealed this
Twenty-fourth Day of September, 2013

Teresa Stanek Rea
*Deputy Director of the United States Patent and Trademark Office*